United States Patent

Wols

[11] Patent Number: 6,027,404
[45] Date of Patent: Feb. 22, 2000

[54] POULTRY THIGH DEBONER WITH MOVABLE STRIPPER

[75] Inventor: Floris Wols, Rotterdam, Netherlands

[73] Assignee: Systemate Holland, B.V., Numansdorp, Netherlands

[21] Appl. No.: 09/234,027

[22] Filed: Jan. 19, 1999

Related U.S. Application Data

[63] Continuation-in-part of application No. 08/988,752, Dec. 11, 1997
[60] Provisional application No. 60/071,972, Jan. 20, 1998.

[51] Int. Cl.[7] .................................................. A22C 17/04
[52] U.S. Cl. .......................................... 452/138; 452/135
[58] Field of Search ...................................... 452/138, 135

[56] References Cited

U.S. PATENT DOCUMENTS

| | | | |
|---|---|---|---|
| 4,377,884 | 3/1983 | Viscoiosi | 452/138 |
| 4,944,067 | 7/1990 | Kulishev et al. | 452/138 |
| 5,064,403 | 11/1991 | Elsten | 452/138 |
| 5,090,940 | 2/1992 | Adkison | 452/138 |
| 5,173,076 | 12/1992 | Hazenbroek | 452/138 |
| 5,782,685 | 7/1998 | Hazenbroek | 452/138 |

*Primary Examiner*—Willis Little
*Attorney, Agent, or Firm*—Thomas, Kayden Horstemeyer & Risley

[57] ABSTRACT

Poultry thighs (13) are placed on carrier trays (22) of a tray conveyor (14) and move on an endless loop conveyor first through a rectilinear loading run (24), then through a curved deboning run (26), and then through a lower return run (25). The curved deboning run extends about the deboning unit (35), which includes a stationary cam drum (36) and a revolving carrier assembly (38) that carries the series of deboning modules (55) about the drum (36). Each deboning module becomes aligned with a carrier tray and is actuated by the cam tracks (81) of the stationary cam drum (36) so as to engage and push the bone of the turkey thigh through the aperture (63) of a stripper disk (61). The stripper disk reciprocates toward the carrier tray during the initial deboning of the thigh and separates from the carrier tray to allow enough space to remove the meat from the apparatus.

7 Claims, 5 Drawing Sheets

POULTRY THIGH DEBONER WITH MOVABLE STRIPPER

CROSS-REFERENCE TO RELATED APPLICATION

This is a continuation-in-part of U.S. patent application Ser. No. 08/988,752, filed Dec. 11, 1997. Applicant also claims the benefit of U.S. Provisional patent application 60/071,972 filed Jan. 20, 1998.

FIELD OF THE INVENTION

The present invention relates in general to a method and apparatus for removing the bones from poultry and animal parts. More particularly, the present invention relates to a method and apparatus for deboning poultry thighs by urging the bone longitudinally with respect to the meat and stripping the meat from the bone.

BACKGROUND OF THE INVENTION

In the processing and preparation of parts of poultry and animals such as poultry thighs for sale and consumption in the retail market, such as in restaurants and grocery stores, it is highly desirable to package and serve the meat with the bones removed. Deboned meat can be easily cut-up and used in sandwiches or other food products where it is desirable to have the bones previously removed prior to cooking and serving.

An additional advantage of removing the bones from the meat during processing and before cooking is that the bones do not have to be cooked with the meat, thereby conserving heat energy.

In the past, automated processes have been developed for the removal of meat from the bone of a poultry part, such as from the thigh bone of a poultry thigh, by engaging the bone with a scraping tool and scraping along the length of the bone. For example, U. S. Pat. Nos. 3,672,000, 4,327,463, 4,495,675, 4,736,492 and 5,001,812 disclose deboning apparatus having two or more notched scraping blades which surround the bone. The blades are closed about the bone with the notches of the blades straddling the bone, and the bone is moved longitudinally through the blades. As the bone is moved through the notched blades, the blades progressively strip the meat from the bone.

However, the raw meat has a tendency to cling tightly to the bone. Consequently, it is necessary for the scraper blades to closely surround the thigh bones to ensure the meat is completely stripped from the bone. A problem that arises with such prior art deboners is that the blades should avoid contact with the bone to avoid gouging or chipping the bones as they strip the meat from the bones. This contact between the hard blade material and the bones increases the tendency of creating bone fragments that can become lodged in the stripped meat, which creates a health risk to the ultimate consumer who expects that when he or she purchases a "boneless" product, it is indeed completely boneless.

In order to avoid the creation of bone fragments during the deboning process, apertured elastic meat stripper disks have been substituted for the scraper blades in some stripping equipment. The bone is pushed longitudinally through the aperture of the disk and the resilient disk retards the movement of the meat, thereby separating the meat from the bone. U.S. Pat. No. 4,811,456 teaches the use of an elastic disk for deboning poultry parts.

Additionally, U.S. Pat. No. 5,173,076 discloses an automated deboning apparatus which includes a series of elastic stripping disks, each of which is mounted adjacent and moves with a conveyor tray on which a poultry thigh is received and moved about a processing path. As each thigh is moved along the processing path, the thigh bone is urged through an opening in a stripper disk, whereupon the meat of the thigh is progressively stripped from its bone.

U.S. Pat. No. 5,782,685 (08/782,876) discloses an automated deboning apparatus which includes a tray conveyor having a series of trays for transporting poultry parts along a loading path and then around a horizontally oriented cam drum where deboning modules revolve about the cam drum and register with each tray and its poultry thigh and debone the thigh. The bone of each thigh is pushed through the opening of a stripper disk so that the meat is retarded as the bone passes through the opening of the disk.

A problem sometimes experienced with conveyor/cam drum systems is that there must be a space between the stripper disk and its tray to allow the meat removed from the bone to have room to be separated from the tray and disk, but the space between the tray and disk should not be so large as to sometimes allow the bone to become misaligned between the tray and disk, resulting in improper deboning and possible breaking of the thigh bone.

Accordingly, it can be seen that it would be desirable to provide an improved method and apparatus for cleanly and completely scraping the meat from the thigh bones of poultry parts or similar animal parts without the risk of creating broken bones or improperly deboned products and for providing adequate clearance in the apparatus for removing the meat and bones from the apparatus.

SUMMARY OF THE INVENTION

Briefly described, the present invention comprises an improved method and apparatus for removing the meat from the bones of poultry, such as removing the meat from thigh bones of turkeys, chickens or other species of poultry. In a preferred embodiment of the invention, the apparatus is a poultry thigh deboner and includes an elongated continuous tray conveyor having a series of poultry thigh carrier trays mounted thereon and moved about an endless loop processing path, and a deboning unit mounted along the processing path of the tray conveyor.

Each carrier tray of the tray conveyor includes an elongated semi-cylindrical recess formed therein which is sized and shaped to receive and to carry a poultry thigh as the thigh is moved along the processing path. The recess of each carrier tray has its length extending normal to the processing path so as to orient the thigh bones of the thighs carried in the recess normal to the processing path. Wings or side flange portions are formed on each side of the semi-cylindrical recess of the carrier tray and reduce the likelihood of the poultry thighs falling or being dropped into the machine. The poultry thighs are loaded into the semi-cylindrical recesses of the carrier trays as the carrier trays are moved along an upper rectilinear run of the tray conveyor into the deboning unit.

The deboning unit includes a stationary cylindrical cam drum having helical cam tracks extending about the cylindrical surface of the cam drum, and a revolving carrier assembly which extends concentrically about the cylindrical surface of the cam drum. The revolving carrier assembly includes a pair of rotary end plates positioned at opposite ends of the cam drum which are rotatably mounted on a horizontal axle that extends longitudinally through the cam drum. The end plates are rotated by a motor about the axle so as to rotate with respect to the cam drum. A series of travel rods are arranged in a cylindrical concentric array about the cylindrical surface of the cam drum, arranged in pairs and mounted at their ends to the rotary end plates.

Deboning modules are each movably mounted on a pair of travel rods. Each deboning module includes a pusher assembly and an apertured meat stripper disk assembly which are aligned with each other and which are movable along the lengths of the pair of travel rods. The pusher assembly and stripper disk of each pair of travel rods are carried by the travel rods into alignment with a carrier tray of the tray conveyor and are rotated in timed relation with their carrier tray after the carrier tray is moved longitudinally through a loading station and then moved in an arc about the cam drum of the deboning unit.

The meat stripper disk assemblies are mounted to the travel rods adjacent the processing path for the carrier trays. Each meat stripper disk assembly includes a flexible stripper disk supported within a rigid collar that stabilizes and supports the stripper disk. An aperture is formed through the center of each stripper disk and the aperture receives the thigh bones therethrough. As the thigh bones are pushed by the pusher assemblies and pass through the apertures of the stripper disks, the meat is progressively stripped from the thigh bones by the stripper disks. Guides are mounted behind and are movable in unison with each stripper disk, aligned with the aperture of each disk. The guides receive and stabilize the thigh bones as the thigh bones are urged through and beyond the stripper disks during a meat stripping operation.

The bone pusher assembly of each deboning module is mounted on and is movable along the length of a pair of travel rods, initially positioned on the opposite side of each carrier tray from its aligned stripper disk. Each bone pusher assembly includes a hollow pusher sleeve having open front and rear ends, and which is mounted on a carrier block slidably attached to the travel rods. A cam follower is affixed to the carrier block and engages and rolls along a first helical cam track formed about the circumference of the stationary cam drum of the deboner unit. As the cam follower engages and moves along its cam track, the pusher sleeve is moved into engagement about the adjacent knuckle of the bone of the poultry thigh and urges the poultry thigh toward its aligned meat stripper disk assembly, with the thigh bone being urged through the aperture of the stripper disk.

A pusher rod is telescopically mounted within each pusher sleeve, extending along the length of its pusher sleeve. Each pusher rod has a tapered front end that telescopes into and out of its pusher sleeve to engage and urge the thigh bone of a poultry thigh completely through the stripper disk, and a rear end that extends outwardly from the open rear end of its pusher sleeve. The rear ends of the pusher rods each are attached to and supported by a carrier block slidably mounted on the travel rods. A cam follower is attached to each carrier block of each pusher rod and engages a second helical cam track formed about the cylindrical surface of the stationary cam drum and extending approximately parallel to the first cam track. As the cam follower of each pusher rod moves along the second cam track, the pusher rod is urged through the pusher sleeve so that the front end of each pusher rod telescopes out of the pusher sleeve to engage and urge the thigh bone of the poultry thigh completely through the aperture of stripper disk to complete the stripping of the meat from thigh bone. Upon completion of the removal of the meat from the bone, the pusher rods and pusher sleeves are retracted from their stripper disks and the meat and the bone drop away from the carrier trays and from the deboning modules for collection and further processing.

In order to avoid the problem of having the bone become misaligned with the aperture of the stripper disk, the stripper disk is mounted to its own carrier block and the carrier block is slidably mounted to the travel rods. A cam follower is affixed to the carrier block and engages and rolls along a third helical cam track formed about the circumference of the stationery cam drum of the deboner unit. As the cam follower engages and moves along its cam track, the stripper disk assembly moves toward and away from the adjacent portion of its carrier tray, closing and later opening the gap between the tray and the disk. This places the stripper disk at the immediate edge of the recess of the carrier tray, so as to reduce the likelihood that the bone of the thigh or other poultry part will become misaligned with the aperture of the stripper disk. The stripper disk remains juxtaposed the carrier tray while the bone pusher assembly moves into engagement with the bone of the poultry thigh and urges the poultry thigh toward the stripper disk and while the thigh bone is moved through the stripper disk.

Once the bone of the thigh has entered the aperture of the stripper disk, the cam track moves the stripper disk away from the carrier tray so as to create a space between the carrier tray where the meat of the thigh will accumulate. Once the bone has been completely removed from the meat of the thigh, the bone pusher retracts from the stripper disk, back through the meat, and the meat is prevented from moving rearwardly with the pusher by the edge of the tray, so that the meat tends to fall away from the stripper disk, tray and bone pusher, to a collection surface. Thus, the movement of the stripper disk toward and away from the adjacent carrier tray alternately closes and opens the space adjacent the carrier tray for the ultimate removable of the deboned meat.

Thus, it is an object of this invention to provide an improved method and apparatus for reliably and expediently removing the meat from the bones of poultry thighs or similar animal parts.

Another object of the invention is to provide an improved automated poultry thigh deboner which uses a relatively small deboning unit to process thighs received from a relatively long conveyor system.

Another object to this invention is to provide an automated poultry thigh deboner for reliably removing the meat from the bones of poultry thighs and similar animal parts, with the deboner having means to more accurately align and maintain alignment of the bone of the poultry part with the stripper, thus avoiding improperly deboned products.

Various other objects, features and advantages of the present invention will become apparent to those skilled in the art upon reading the following specification when taken in conjunction with the accompanying drawings.

DETAILED DESCRIPTION

Figure 1:
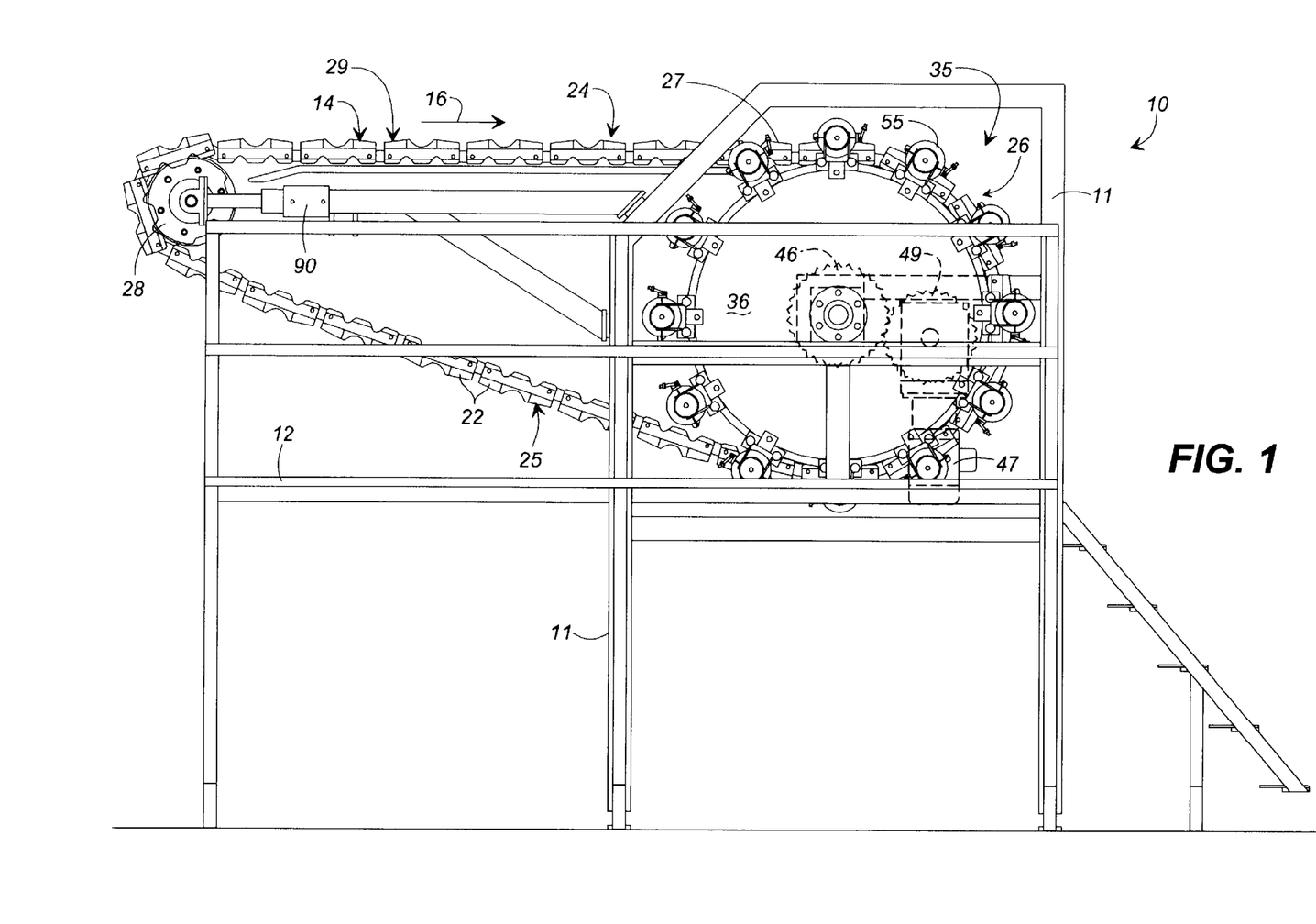
FIG. 1 is a side elevational view of the poultry thigh deboner.
Figure 2:
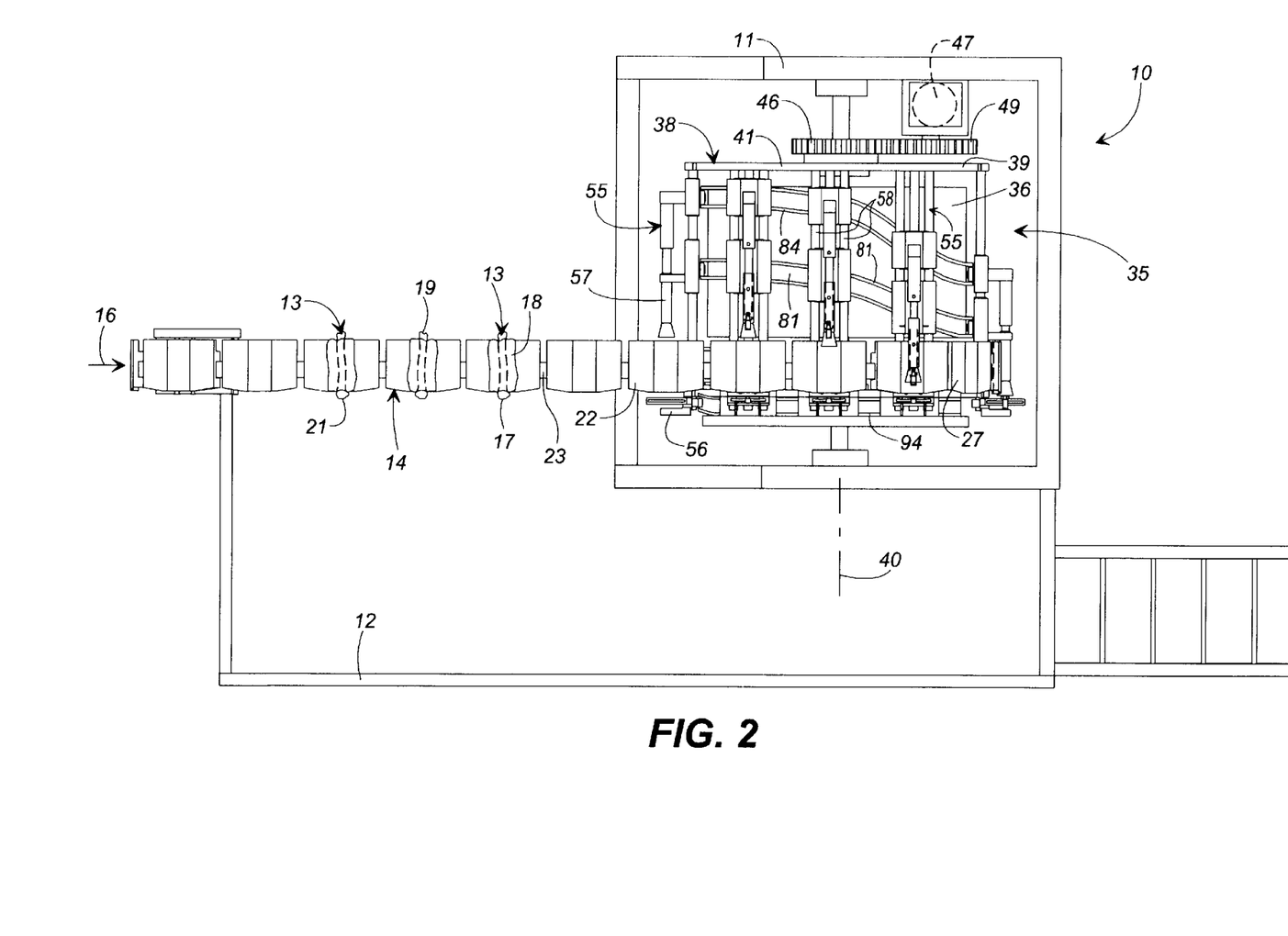
FIG. 2 is a plan view of the poultry thigh deboner.
Figure 3:
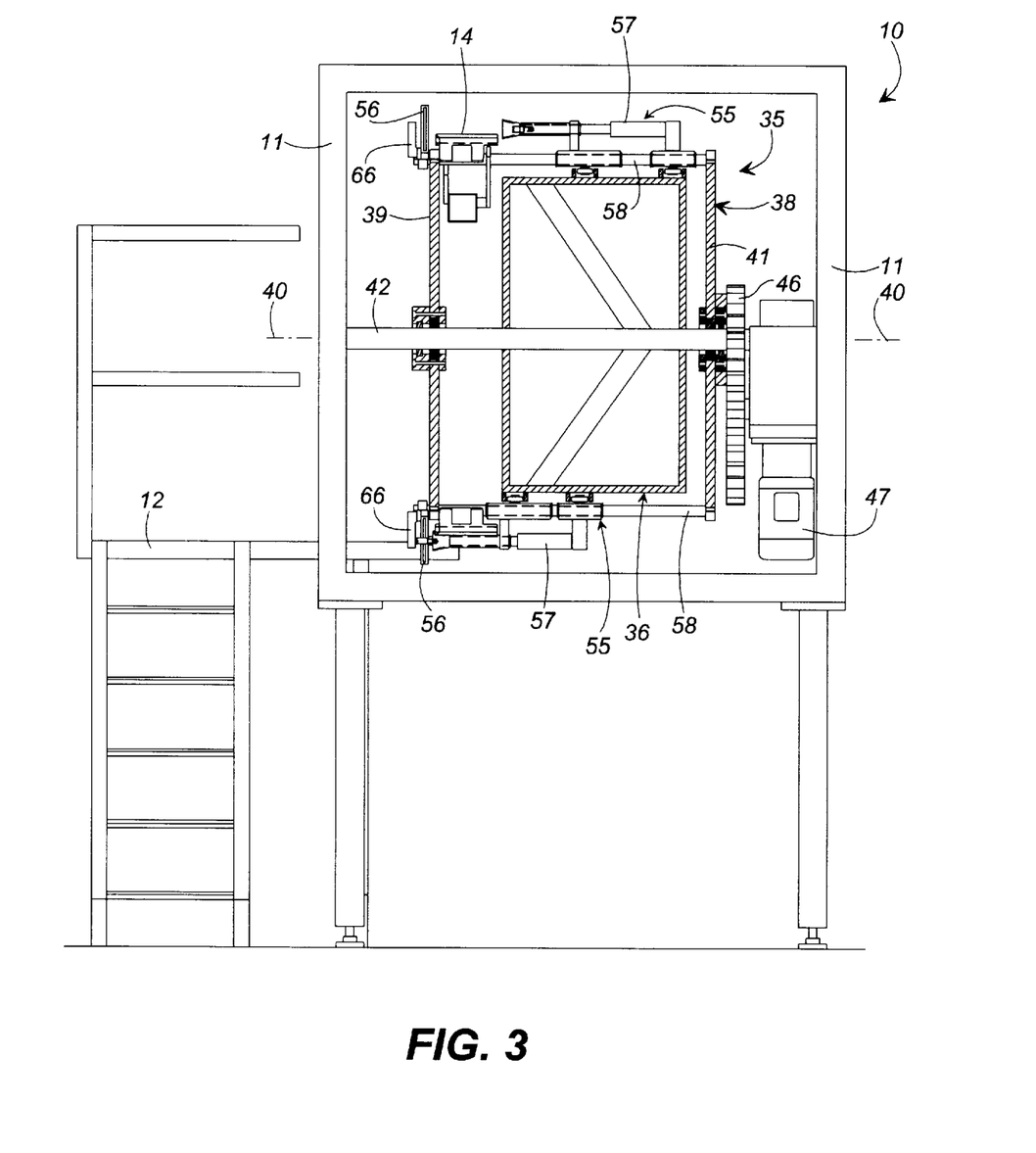
FIG. 3 is an end view of the poultry thigh deboner, taken in partial cross-section.

Referring now in greater detail to the drawings in which like numerals indicate like parts throughout the several views, FIGS. 1–3 illustrate the poultry thigh deboner 10 which includes a supporting framework 11 with an operators platform 12 mounted thereto. The operator's platform 12 is positioned adjacent and generally in front of the supporting framework, attached thereto by welding. The platform provides a place for one or more workers (not shown) to stand while loading poultry thighs 13 (FIG. 2) onto a continuous tray conveyor 14 of the poultry thigh deboner for movement along a processing path 16 for deboning of the poultry thighs.

As shown in FIG. 2, each of the poultry thighs 13 includes an elongated thigh bone 17 shown in dash lines surrounded along its length by meat 18. The thigh bones further include a large knuckle end 19 and a small knuckle end 21. The poultry thighs are loaded on the tray conveyor in a horizontal, flat-lying attitude for transport along the processing path 16, with the length of the bone extending at a right angle with respect to the direction of the processing path, as shown in FIG. 2.

As FIGS. 1, 2 and 7–10 illustrate, the tray conveyor 14 is an endless loop conveyor that includes a series of carrier trays 22 connected by linkages or couplings 23 (FIG. 8) and extended in an endless loop along the processing path 16. The tray conveyor further includes an upper rectilinear loading run 24 (FIG. 1) and a lower return run 25 and a curved deboning run 26. An idler sprocket 28 is mounted between the upper loading run 24 and the lower return run 25 adjacent the loading end 29 of the tray conveyor, with the tray conveyor extending thereabout for guiding the tray conveyor upwardly and over and along its upper run.

Figure 7:
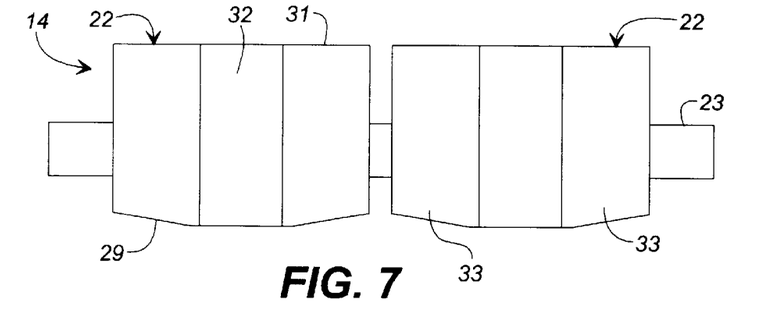
FIG. 7 is a top view of adjacent carrier trays.
Figure 8:
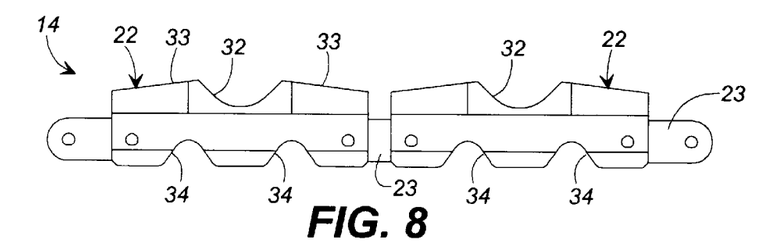
FIG. 8 is a side view of adjacent carrier trays.
Figure 9:
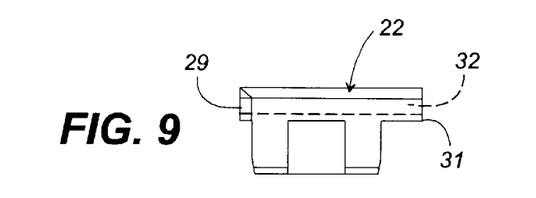
FIG. 9 is an end view of a carrier tray.

As shown in FIG. 7, each of the carrier trays 22 is an approximately rectangularly shaped plate formed from a plastic such as nylon, or a metal such as stainless steel, and having a front edge 29, a rear edge 31 and a semi-cylindrical recess 32 formed approximately along the center of each tray extending between its front and rear edges. Each semi-cylindrical recess 32 is sized and shaped to receive and support a poultry thigh 13 therein. The semi-cylindrical recesses each function as a cradle or holding means for receiving and holding the poultry thighs with the thigh bones extending along the length of the recess. Each carrier tray further includes a pair of side flanges or wings 33 that extend laterally from the side to the semi-cylindrical recesses. The wings 33 function to prevent the poultry thighs 13 from falling or being dropped into the machine as they are loaded into the semi-cylindrical recesses of the carrier tray by an operator(s). Arched grooves 34 (FIG. 8) are formed in the underside of each carrier tray and form protrusions therebetween, and the grooves and protrusions engage teeth formed in the idler sprocket 28 as the carrier trays move thereabout.

As shown in FIGS. 1–3, a deboning unit 35 is positioned adjacent the downstream end 27 of the loading run 24 of the tray conveyor 14. The deboning unit is mounted to and supported by the support framework 11, with the tray conveyor extended and revolving thereabout. The deboning unit includes a substantially cylindrical stationary cam drum 36 affixed in a stationary position to the support frame by stationary axle 42. The cam drum 36 is formed from steel or similar rigid material and a revolving carrier assembly 38 is rotatably mounted about the cam drum. The carrier assembly 38 includes a pair of rotatory end plates 39 and 41 mounted adjacent the opposite ends of the cam drum 36, as illustrated in FIG. 3, with the end plates being spaced from the cam drum 36 (FIG. 3). Each of the end plates is a disk formed from steel or similar sturdy material and the end plates are rotatable with respect to the cam drum 36 about the axis of rotation 40, coincident with axle 42, in the direction of the processing path 16.

The rotary end plates 39 and 41 are rotatably mounted on the stationary axle 42 that extends through the cam drum 36 and through the rotary end plates, and the axle 42 is connected at its ends 43 to the supporting framework 11. A sprocket 46 is mounted about the axle 42 adjacent end plate 41 and is attached to the end plate 41. As illustrated in FIGS. 1–3, a drive motor 47 is mounted to the framework, adjacent an end of the drive shaft. The drive motor 47 includes a drive shaft that drives a drive sprocket 49 (FIG. 1). The drive sprocket 49 engages the sprocket 46 attached to end plate 41 in a driving relationship such that as the drive motor rotates its drive shaft, the drive sprocket is rotated in engagement with the sprocket, which in turn causes the deboning unit 35 to revolve about the stationary cam drum 36.

Figure 4:
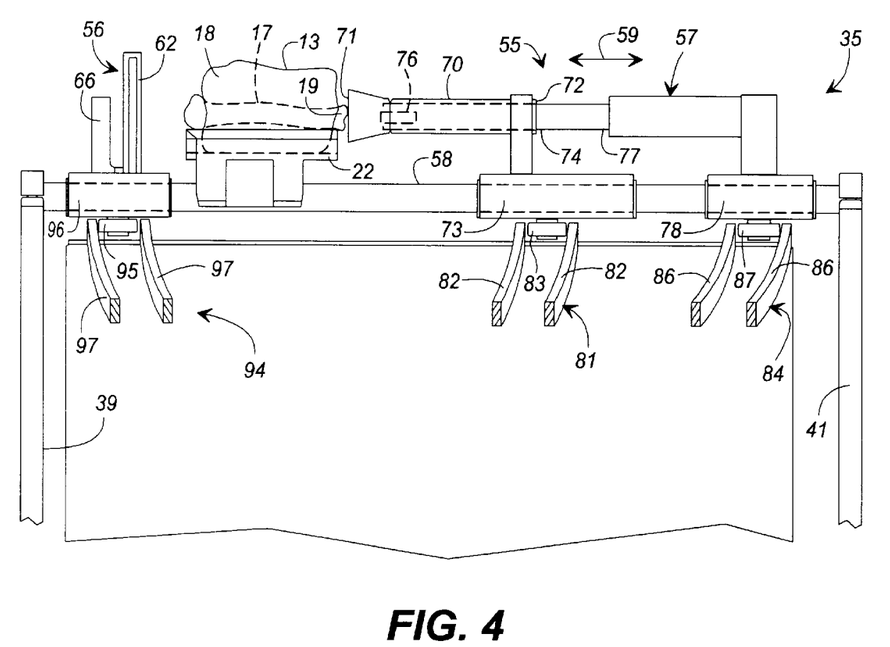
FIG. 4 is a side view of a deboning module showing its relationship with the cam drum and a carrier tray of the tray conveyor.
Figure 5:
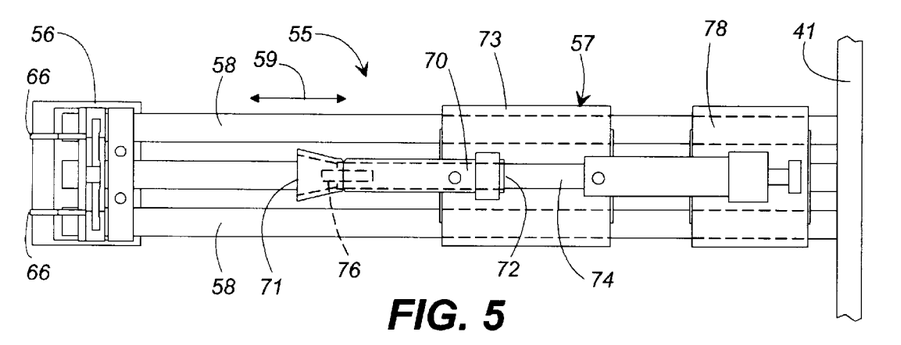
FIG. 5 is a top view of a deboning module.

As best shown in FIGS. 2, 4 and 5, a series of deboning modules 55 are supported by the end plates 39 and 41 and are arranged in spaced series about the circumference of the cam drum 36. Each of the deboning modules includes a pair of travel rods 58 mounted at their ends to end plates 39 and 41, a meat stripper disk assembly 56 mounted at one end of the pair of travel rods and a bone pusher assembly 57 that moves along the travel rods. The travel rods are arranged parallel to one another and parallel to the axle 42 and typically are formed from steel or similar metal, and are mounted at their ends to and extend between the end plates 39 and 41, arranged in pairs.

As FIGS. 1 and 3 indicate, the tray conveyor 14 extends over and about the travel rods 58 of the deboning modules 55 of the deboning unit 35, with the arched depressions 34 (FIG. 8) of the carrier trays in engagement with the travel rods 58 so as to move with the movement of the deboning modules about the cam drum. The travel rods thus act as a drive sprocket that engages and drives the continuous tray conveyor 14 about its processing path.

Figure 6:
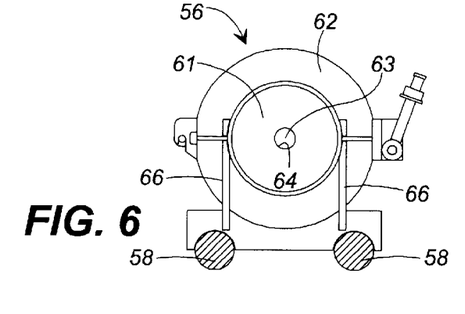
FIG. 6 is a side elevational view of a meat stripper assembly.

FIGS. 4–6 illustrate the deboning module 55 with its meat stripper disk assembly 56 and bone pusher assembly 57 in greater detail. As FIGS. 4 and 5 illustrate, the meat stripper disk assembly 56 of each deboning module 55 is mounted to a pair of travel rods 58 in spaced series from one another about the circumference of the front rotatory end plate 39. As deboning unit 35 revolves about cam drum 36, each carrier tray 22 of the continuous tray conveyor 14 is moved onto a pair of travel rods 58 and into alignment with a meat stripper disk assembly 56 and is maintained in alignment with the meat stripper disk as it is revolved about the cam drum of the deboning unit. As shown in FIG. 6, each meat stripper disk assembly 56 includes a flexible stripper disk 61 formed from rubber or similar resilient material mounted in a rigid annular collar or holder 62 that is slidably mounted to a pair of travel rods 58. An aperture 63 is formed in the center of each stripper disk 61 and includes a substantially circular stripper edge 64. The aperture of each stripper disk becomes aligned with the semi-cylindrical recess 32 of a carrier tray as the carrier tray and aligned meat stripper disk are moved in timed relationship about the cam drum.

The aperture 63 of the stripper disk 61 receives the thigh bones 17 of the poultry thighs 13, with the stripper edge 64 of the aperture on the side of each stripper disk that faces the carrier trays 22 being chamfered to aid in the passage of the thigh bones therethrough. Each stripper edge 64 of each aperture 63 snugly engages the thigh bone of each poultry thigh and retards the passage of the thigh meat 18 through the aperture. As a consequence, the thigh bones pass through the apertures and the thigh meat of the poultry thigh is progressively stripped from the thigh bones and remains at the adjacent surface of the disk.

As shown in FIG. 6, the holders 62 of each meat stripper disk assembly 56 are substantially circular metal frames circumscribed about the outer edge of each stripper disk 61. The holders function to hold the stripper disks in place as the thigh bones are urged through the apertures of the stripper disks during a stripping operation. The holders thus ensure that the flexible stripper disks do not collapse or are not pushed rearwardly by the thigh bones during a stripping operation.

A bone guide 66 is mounted to the stripper disk assembly 56, positioned behind each stripper disk 61 and straddling the aperture formed within each stripper disk. The bone guides 66 define a central opening of a sufficient diameter to enable the knuckles 19 and 21 of each thigh bone 17 to pass therethrough without interfering, but yet restricting excess movement of the thigh bones from side to side or vertically during the stripping and separation of the thigh meat therefrom.

As shown in FIGS. 4 and 5, each bone pusher assembly 57 is slidably mounted on a pair of parallel travel rods 58, initially positioned in a position retracted from its meat stripper disk assembly 56, and aligned with the semi-cylindrical recess 32 formed in the carrier tray 22 of the continuous tray conveyor 14. Each bone pusher assembly 57 includes a hollow substantially cylindrical pusher sleeve 70 having an open front end 71 and an open rear end 72 and is mounted upon a carrier block 73. The carrier block 73 is slidably mounted on the travel rods 58 to enable the pusher sleeve 70 to be moved laterally toward and away from its stripper disk assembly 56 in the directions of arrow 59 into engagement with a poultry thigh 13 positioned on its carrier tray 22.

A cylindrical pusher rod 74 is received and extends through each pusher sleeve 70, projecting rearwardly from the rear end 72 of each pusher sleeve. Each pusher rod 70 is slidably mounted within its pusher sleeve and has a front end 76 that telescopes into and out of the front end 71 of each pusher sleeve 70 to engage and urge the large knuckle end 19 of a thigh bone 17 through the aperture 63 of its aligned stripper disk 61, and a rear end 77 extends out the open rear end of each pusher sleeve. The rear end 77 of each pusher rod 74 is mounted to a carrier block 78 that is slidably mounted on the travel rods 58 for moving the pusher rod laterally in the directions of arrow 59 toward and away from engagement with the thigh bone.

As shown in FIGS. 2 and 4, a first cam track 81 is formed about the cam drum 36 of the deboning unit 35, positioned beneath the pusher sleeve 70 of the deboning modules 55. The first cam track extends helically about the circumference of the cam drum and includes a pair of parallel upstanding side walls 82. A cam follower 83 is mounted to the bottom of the carrier block 73 of each pusher sleeve 70 and is received between and rolls along the side walls 82 of the first cam track 81 as the deboning modules are revolved about the cam drum. As the cam followers 83 engage and roll along the first cam track, the pusher sleeves 70 are moved laterally in the direction of arrows 59 toward and away from the carrier trays, causing the pusher sleeves to engage and urge the poultry thighs 13 toward their aligned meat stripper disk assemblies 56.

A second helical cam track 84 is formed about the cam drum 36 of the deboning unit 35, extending generally parallel to the first cam track 81 and having parallel upstanding side walls 86. A cam follower 87 is mounted to the bottom of each carrier block 78 for each pusher rod 74 and engages and rolls along side walls of the second cam track as the deboning modules are revolved about the cam drum. As the cam followers 87 of the carrier blocks 78 roll along the side walls 86 of the second cam track 84, the pusher rods 74 are moved in the directions of arrows 59, moving with their pusher sleeves 70 to engage and urge the thigh bones poultry thighs through the stripper disks 61, and to return to a retracted position.

A third helical cam track 94 is formed about the cam drum 36 of the deboning unit 35, and having parallel upstanding side walls 97. A cam follower 95 is mounted to the bottom of a carrier block 96 for each stripper disk assembly 56 and engages and rolls along the side walls 97 of the third cam track 94 as the stripper disk assemblies are revolved about the cam drum 36. As the cam followers 95 of the stripper disk assemblies roll along the side walls 97 of the third cam track 94, the stripper disks are moved in the directions of arrows 59, moving the stripper disks into and away from juxtaposition with respect to the adjacent edge of a carrier tray 22, so as to place the stripper disk immediately adjacent the carrier tray and the adjacent end of the bone 17 of the poultry thigh during the initial deboning process. This places the poultry thigh as close as possible to the stripper disk, so that later movement of the poultry thigh toward the stripper disk will cause the leading end of the bone to immediately enter the aperture of the stripper disk, avoiding the opportunity of the bone to become misaligned with the aperture as the carrier tray 22 and its poultry thigh begin to revolve in a downward arc about the cam drum 36. In the meantime, the pusher rods 74 will begin their pushing function, to push the bone on through the stripper disk.

Once the bone enters the aperture of the stripper disk and the stripping function commences, the stripper disk can be moved away from the adjacent edge of the carrier tray, leaving enough space between the stripper disk and the carrier tray to accumulate the meat from the bone.

As illustrated in FIG. 4, the first, second and third cam tracks 81, 84 and 94 curve helically and extend diagonally toward the tray conveyor 22 as they extend around the cam drum 36 of the deboning unit 35, to cause the bone pusher assemblies 56 to move along their travel rods 58 into engagement with the poultry thighs 13 on the carrier trays 22 during a meat stripping operation and to place the meat stripper 56 immediately adjacent the carrier tray 22. The cam wheel 95 engages cam track 94 and moves the block 96 along the guide bars 58, so as to reciprocate the stripper disk toward and away from the adjacent carrier tray 22. Once the stripper disk is located adjacent a carrier tray 22, the cam track 94 extends along a substantially straight path as the bone pusher performs the initial part of the meat stripping function. This allows the first end of the thigh bone to enter the aperture while the tray and stripper disk are close to each other. Once the bone enters the disk aperture and the bone is safely aligned with the stripper, the third cam track returns toward its original open position to create more space between the carrier tray and the stripper disk to allow the meat which has been removed from the bone to be removed from the equipment. The thigh bones 17 are pushed through the apertures 63 of the stripper disk 61 and are separated from the thigh meat to complete the stripping operation. Thereafter, the cam tracks 81 and 84 begin to curve and extend diagonally away from the tray conveyor 22 to cause the bone pusher assemblies 55 to return to their retracted, loading positions where the bone pusher assemblies 57 are withdrawn from over the continuous tray conveyor 14, allowing the conveyor to move away from engagement with the deboning unit 35.

Typically, as the thigh bones and thigh meat are separated, they are dropped out of the bottom of the poultry thigh deboner. A removal conveyor (not shown) or other collection means can be positioned below the poultry thigh deboner so as to catch the thigh bones and thigh meat for collection and removal for inspection and further processing as needed.

Figure 10:
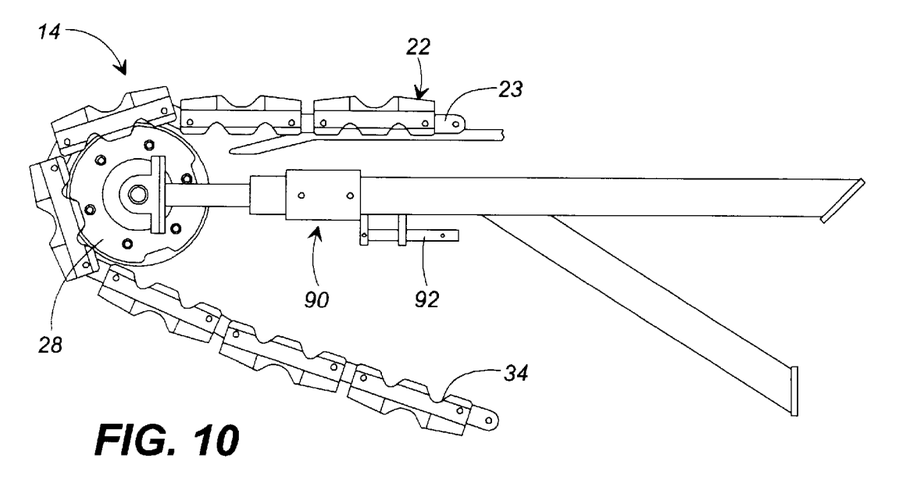
FIG. 10 is a side view of a portion of the continuous tray conveyor.

As illustrated in FIGS. 1 and 10, a conveyor tensioner 90 is mounted to the support framework 11 adjacent the loading and 23 of the tray conveyor 14. The tensioner generally includes a bracket 91 slidably mounted to the framework and attached at one end to the idler sprocket 28 of the tray conveyor. A travel screw 92 is attached to the bracket for moving the extension bracket longitudinally with respect to the framework to move the idler sprocket of the tray conveyor longitudinally in order to take up or create slack within the tray conveyor.

In addition, the construction of the poultry thigh deboner 10 of the present invention advantageously enables the expansion of the tray conveyor 14 by the addition of extra carrier trays 22 to the tray conveyor and a longer extension bracket 90 to the framework. As a result, the quantity of carrier trays 22 on the tray conveyor can be increased so that more than one operator can be stationed at the loading run 24 to enable increased numbers of poultry thighs to be loaded onto the poultry thigh deboner. As a result, the number of poultry parts being processed through the poultry thigh deboner can be significantly increased and the speed of revolution of the carrier assembly about the cam drum accordingly increased to increase the production capacity of the poultry thigh deboner.

Therefore, it will be understood by those skilled in the art that while the present invention has been disclosed with reference to a preferred embodiment, various modifications, changes and additions can be made thereto without departing from the spirit and scope of the invention.

I claim:

1. A poultry processing apparatus for removing the bone from the thigh of a bird comprising:

a stationary cam drum;

continuous helical cam track means extending about said cam drum;

a revolving carrier assembly surrounding and concentric with said cam drum and including a continuous series of deboning modules spaced about said cam drum and movable along said cam track means;

drive means for revolving said carrier assembly about said stationary cam drum;

each of said deboning modules including a meat stripper means, a poultry part carrier and a bone pusher, with said meat stripper and said poultry part carrier movable toward and away from each other in response to revolving about said cam track means;

a continuous tray conveyor including a plurality of poultry thigh carrier trays arranged in spaced series for transporting poultry thighs in registration with said carrier modules;

conveyor guide means for guiding each of said carrier trays along a substantially rectilinear loading path toward said revolving carrier assembly, about said revolving carrier assembly, and along a return path to the loading path;

so that poultry thighs are loaded on said carrier trays as the carrier trays move along the loading path, the carrier trays move from the loading path and about the revolving carrier assembly and guide the thighs into registration with said deboning modules, the cam track means actuates the bone pushers and meat strippers to move the meat strippers adjacent carrier trays and to push the bones from the carrier trays through the meat strippers as the carrier trays move with the revolving carrier to strip the meat from the bones of the thighs, and to separate the meat strippers from the carrier trays to allow the meat separated from the bone to be removed from the apparatus, and the carrier trays move away from the revolving carrier along the return path.

2. The poultry processing apparatus of claim 1 and wherein:

said revolving carrier includes end plates positioned at opposite ends of said cam drum rotatable about the longitudinal axis of said cam drum;

said deboning modules each include pairs of travel rods connected at their ends to said end plates, cam follower blocks movable along said pairs of travel rods in response to engagement with said cam track and movement about said cam drum, said reciprocatable bone pusher and said meat stripper of each deboning module being mounted to and movable with cam follower blocks toward and away from each other;

so that the meat strippers are movable with respect to the carrier trays as the meat is stripped from the bone.

3. A process of removing bones from poultry thighs and similar edible bone and meat parts, comprising the steps of:

supporting each thigh on a carrier tray;

moving a plurality of carrier trays with a poultry thigh supported on each carrier tray in series first along a loading path toward a deboning unit, and then revolving the carrier trays and poultry thighs about a deboning unit, with the bone of each thigh extending transverse to the direction of movement;

as the carrier trays and poultry thighs revolve about the deboning unit placing a meat stripper disk in juxtaposition with each carrier tray and urging the bone of each poultry thigh longitudinally through an aperture formed in a meat stripper disk;

as each bone is urged through the aperture of a meat stripper disk assembly, retarding the movement of the meat with the stripper disk assembly to separate the meat from the bone;

urging the trailing end of the bone on through the aperture of the meat stripper disk assembly while retaining the meat at the meat stripper disk assembly to complete the removal of the meat from the bone; and separating the stripper disk from the carrier tray a distance sufficient to allow the meat to be removed from between the stripper disk and the carrier tray.

4. The process of claim 3 and herein the step of moving a plurality of poultry thighs in series along a processing path first along a loading path toward a revolving deboning unit and then revolving the poultry thighs about a deboning unit comprises placing each poultry thigh within a recess formed in one of a plurality of carrier trays, and moving the carrier trays first along a rectilinear loading path and then in an arcuate path about a deboning unit.

5. A process of stripping meat from bones of a plurality of poultry parts each having an elongated bone and meat surrounding the bone, comprising:

advancing a plurality of carrier trays in spaced series along a processing path;

placing the poultry part on each carrier tray, with a bone of each poultry part extending normal to the processing path;

aligning each carrier tray and the bone of the poultry part with a stripper disk on one side of the carrier tray and a bone pusher on the other side of the carrier tray;

moving the stripper disk into juxtaposition with the carrier tray and moving the bone pusher across the carrier tray and into engagement with one end of the bone of the poultry part and pushing the bone with the bone pusher through an aperture of the stripper disk; and while the stripper disk and carrier tray are still aligned, and after the bone has entered the aperture of the stripper disk, moving the stripper disk and the carrier tray apart from each other.

6. A poultry processing apparatus for removing bone from the thigh of a bird, comprising:

a cam track;

a deboning module movable along said cam track;

said deboning module including a meat stripper, a poultry part carrier, and a bone pusher, with at least one of said meat stripper and said poultry part carrier movable toward and away from said poultry part carrier and said meat stripper in response to moving along said cam track.

7. The poultry processing apparatus of claim 6, and wherein:

said meat stripper being movable toward and away from said poultry part carrier in response to said meat stripper moving along said cam track.

* * * * *